United States Patent [19]

Tsujimoto

[11] 4,274,720
[45] Jun. 23, 1981

[54] AUTOMATIC FOCUS CONTROL DEVICE FOR OBJECTIVE LENS EXCHANGEABLE CAMERAS

[75] Inventor: Kayoshi Tsujimoto, Osaka, Japan

[73] Assignee: Minolta Camera Kabushiki Kaisha, Osaka, Japan

[21] Appl. No.: 31,925

[22] Filed: Apr. 20, 1979

[30] Foreign Application Priority Data

Apr. 21, 1978 [JP] Japan .................................. 53-47980

[51] Int. Cl.³ .............................................. G03B 3/10
[52] U.S. Cl. ....................................... 354/25; 354/195
[58] Field of Search ............. 354/25, 43, 46, 195–197, 354/266, 286; 352/140; 358/227

[56] References Cited

U.S. PATENT DOCUMENTS

| 3,683,777 | 8/1972 | Miyagawa | 354/25 |
| 3,798,660 | 3/1974 | Hasigawa et al. | 354/25 |
| 3,827,064 | 7/1974 | Kiyohara et al. | 354/25 |
| 3,914,026 | 10/1975 | Kanno | 354/195 X |
| 3,940,777 | 2/1976 | Komine | 354/197 |
| 3,972,056 | 7/1976 | Tsujimoto et al. | 354/25 |
| 4,092,656 | 5/1978 | Lang et al. | 354/286 X |
| 4,146,317 | 3/1979 | Date et al. | 354/43 X |

FOREIGN PATENT DOCUMENTS 2734725 2/1978 Fed. Rep. of Germany .......... 354/266

Primary Examiner—L. T. Hix
Assistant Examiner—William B. Perkey
Attorney, Agent, or Firm—Watson, Cole, Grindle & Watson

[57] ABSTRACT

In an automatic focusing system for a camera having an exchangeable lens, the camera body includes a control mechanism for controlling the focus of the exchangeable lens in accordance with an output of a photoelectric focus or distance detecting element. The control mechanism is interlocked by an intermediate elongated member with a lens displacing mechanism in the exchangeable lens, with the intermediate member extending within an aperture of the lens mount. The exchangeable lens may be of the type wherein a rear lens group is moveable for focusing.

6 Claims, 9 Drawing Figures

AUTOMATIC FOCUS CONTROL DEVICE FOR OBJECTIVE LENS EXCHANGEABLE CAMERAS

BACKGROUND OF THE INVENTION

1. Field of the Invention

The present invention relates to an automatic focusing or focus control device for use in a camera with which exchangeable objective lenses are selectively and detachably mounted, and more particularly it pertains to a coupling mechanism between a focus control mechanism in the camera and a lens driving mechanism in the exchangeable objective.

2. Description of Prior Art

An automatic focusing device for an objective lens exchangeable camera has been proposed by a Japanese Laid-Open Patent No. 48-53718. In the known device, however, an objective lens is axially displaced by a lens mount which supports an objective lens and is moved along the optical axis of the objective. Because of its arrangement, such device is applicable only to a specific type of objective in which focusing is made by the entire lens system being integrally moved. In addition, it is difficult for such device to avoid increases of its weight and size because the lens mount and a bearing or support for it must be made large and steady in order to displace a comparatively heavy objective in a predetermined incremental displacement range (which is generally large in may interchangeable lenses) without tilting the optical axis of the objective.

Further difficulties may be encountered when such an automatic focus device is to be associated with an objective which, as is common with single lens reflex cameras, has a so-called automatic diaphragm aperture control device wherein, in response to a shutter release operation, the diaphragm is stopped down to an aperture value manually preset or an aperture value to be automatically determined in accordance with scene brightness. For example, a coupling pin interlocking a diaphragm mechanism in the objective with a camera mechanism has to be made long enough to maintain the interconnection even when an objective mount is displaced fowardmost to a hyperfocal position. On the other hand, the coupling pin must not interfer with any mechansim inside the camera, e,g, a reflex mirror for a single-lens reflex camera when the objective is displaced rearmost to an infinity (focused position). Thus, the known mechanism imposes great restrictions on the mechanisms incorporated in a camera or provided between the camera and the objective, and restricts the variety of combinations between camera bodys and exchangeable lenses.

SUMMARY OF THE INVENTION

Accordingly, the primary object of the present invention is to provide an automatic focusing device which may be used for an objective lens exchangeable camera but which is free from the above mentioned disadvantages inherent to the prior art structure.

Another object of the present invention is to provide an improved coupling or interlocking mechanism for controlling focus of an exchangeable lens by a mechanism incorporated in a camera body.

Still another object of the present invention is to provide an automatic focusing device for use in an objective lens exchangeable camera which enables a wide variation of the combination of camera and exchangeable lens.

A further object of the present invention is to provide an automatic focus control device which controls focusing of an exchangeable lens without moving the whole structure of the exchangeable lens.

BRIEF DESCRIPTION OF THE DRAWINGS

The above and other objects and features of the invention will appear more fully hereinafter from a consideration of the following description taken in connection with the accompanying drawing wherein exemplary embodiments are illustrated.

DETAILED DESCRIPTION OF PREFERRED EMBODIMENTS

Figure 1:
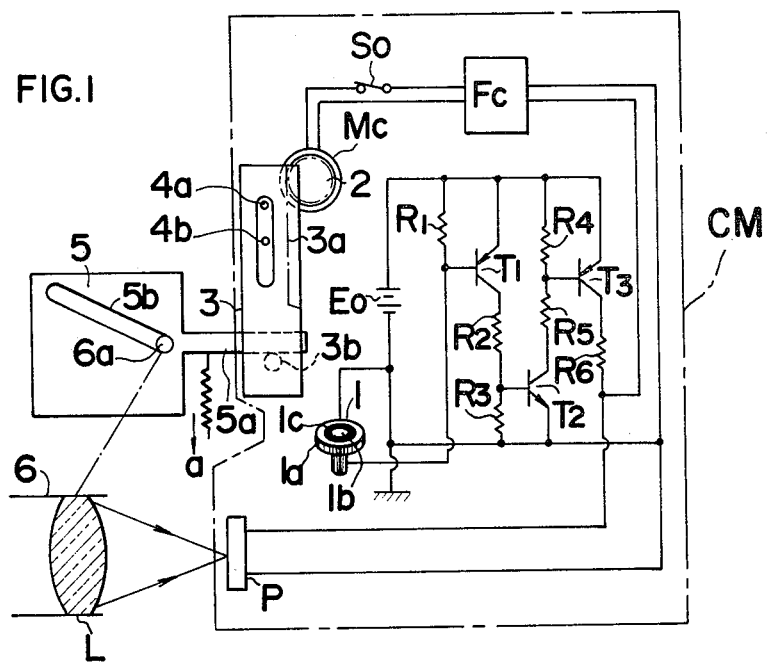
FIG. 1 is a schematic illustration of an embodiment of the present invention.

With reference to FIG. 1 showing a schematic diagram of a focus control mechanism according to an embodiment of the present invention, shutter release button 1 has on the top surface thereof a finger-touch responsive switch including electrodes $1a$ and $1b$ isolated by insulator $1c$. Electrode $1b$ is connected through resistor R1 to the positive electrode of battery Eo, and to the base of transistor T1, while electrode $1a$ is grounded to the camera body and connected to the negative electrode of battery Eo. To the collector of transistor T1 are serially connected resistors R2 and R3 which constitute a voltage divider, with the node between resistors R2 and R3 connected to the base of amplifier transistor T2. Connected in series to the collector of transistor T2 are resistors R4 and R5 for biasing the base of transistor T3. Transistor T3 is used for energization, and its collector is connected through resistor R6 to focus control circuit Fc. Light receiving element P detects the focusing condition of objective lens L, and it is located at a position optically equivalent to the film plane with respect to objective lens L. The output of light receiving element P is transferred to focus control circuit Fc. When objective lens L is in an out-of-focus condition, focus control circuit Fc operates to drive electric motor Mc.

Figure 2:
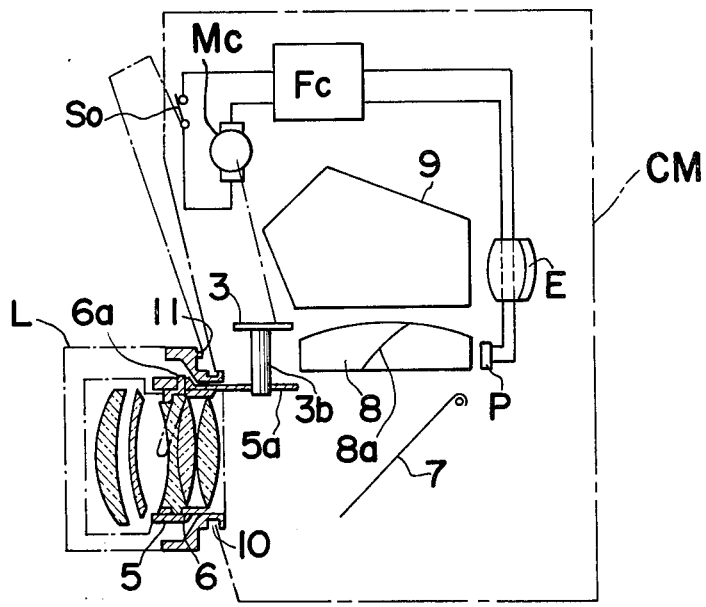
FIG. 2 shows schematically an optical system to be used with the device shown in FIG. 1.
Figure 3:
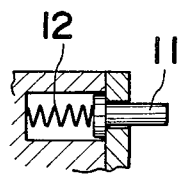
FIG. 3 is a partial enlarged sectional view of a switch operating pin of FIG. 2.

When electric motor Mc is driven, gear 2 rotates, causing slide plate 3 with tooth portion $3a$ to laterally move under the guide of pins $4a$ and $4b$ received in a slot of slide plate 3. Pin $3b$ is spring-biased in the direction of arrow a, engaging coupling arm $5a$ of lens drive ring 5. Coupling arm $5a$ is then moved laterally or rotationally inside a mount on the lens barrel, and at the same time inside the opening of an objective mount on camera body Cm, whereby the rotational position of lens drive ring 5 is determined in accordance with the position of slide plate 3. Formed on lens drive ring 5 is cam groove 5b, which in turn receives pin 6a interconnected with objective lens L. Thus rotation of the lens drive ring 5 moves lens frame 6 along the optical axis, which hold a lens group of objective lens L to be moved for focusing and when objective lens L is in focus, focus control circuit Fc stops electric motor Mc, whereby the movement of the lens group is stopped. FIG. 2 shows an optical system of the above mentioned embodiment in more detail as, for example, used in a single-lens reflex camera. Referring to FIG. 2, light coming from a scene to be photographed and passing through objective lens L of standard focal length is reflected at reflex mirror 7 and introduced through condenser lens 8 and pentagonal prism 9 to eyepiece E, and at the same time is focused on light receiving element P by means of concave semi-transparent mirror 8a in condenser 8. Thus, the light receiving surface of light receiving surface of light receiving element P is at the position optically equivalent to the focal plane (film plane). Objective lens L is mounted on camera body Cm with mount 10 of the lens coupled with the objective mount of the camera (not shown). Signal pin 11 is forced by spring 12 to project rearward, as shown in enlarged size in FIG. 3, and when objective lens L is coupled to camera body, Cm signal pin 11 extends into the hole formed at a given place on camera body Cm to close power switch So. It should be noted that in case the objective L is coupled with camera body Cm through a bayonet type objective mount with which the coupling between object lens L and camera body Cm is secured by rotating objective lens L for a predetermined angle after their mounting and the objective mount have been fitted together, signal pin 11 remains pushed inside a lens barrel against the action of spring 12 until objective lens L is rotated into a predetermined angular position.

With objective lens L attached to camera Cm body, signal pin 11 closes power switch So, causing focus control circuit Fc to be operative. When the operator touches shutter release button 1 looking into a viewfinder through eyepiece E to aim at any desired object, transistor T1 turns on, causing power of battery Eo to be applied through output transistor T3 to focus control circuit Fc and light receiving element P. As a result, electric motor Mc is driven, causing lens frame 6 to be moved via coupling arm 5a for focusing. When objective lens L reaches focus condition, electric motor Mc is stopped and the movable lens group of objective lens L is set at a focusing position.

Figure 4:
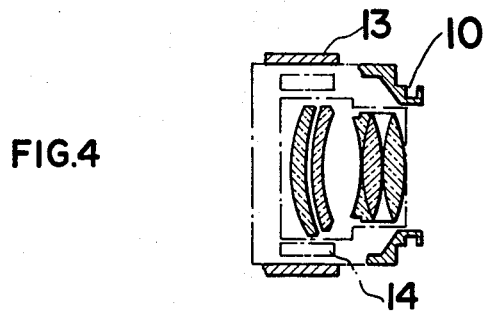
FIG. 4 is a diagramatical sectional view of a manually focused exchangeable lens.

As shown in FIG. 4, when a manual type objective lens, in which a lens group is displaced through helicoid 14 by manual rotation of a distance adjusting ring not shown without using a connecting arm and a signal pin, is attached to a camera having the focus control mechanism, power switch So is not closed by a signal pin, and focus control circuit Fc remains inoperative. In this case, manual focusing may be possible using a distance adjusting ring or manual focusing ring.

Figure 5:
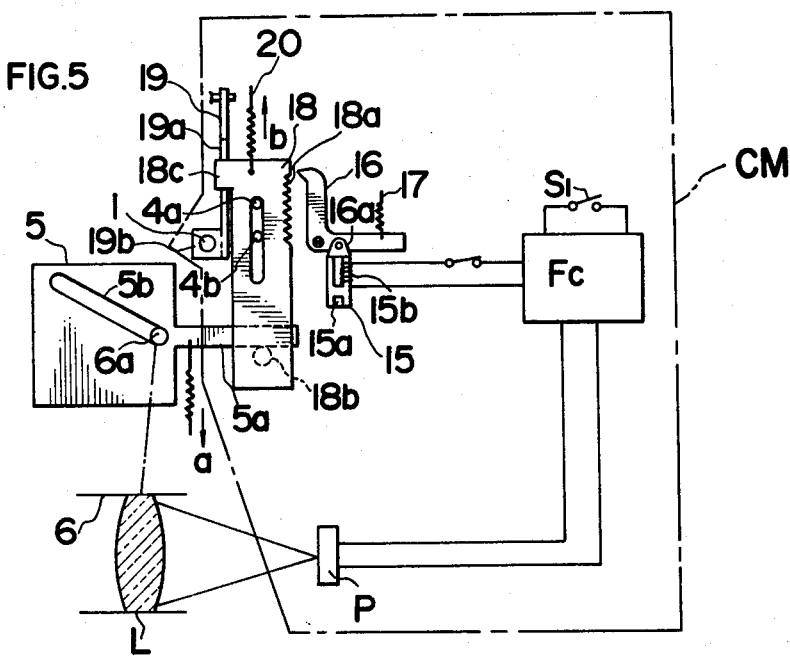
FIG. 5 is a schematic illustration of another embodiment of the present invention.
Figure 6:
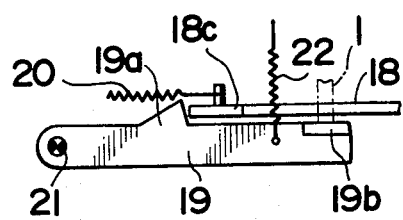
FIG. 6 is a side elavational view of a portion of the mechanism shown in FIG. 5.

FIG. 5 shows another embodiment concerning a focus control mechanism, wherein the same reference symbols are used for the members corresponding to those of FIG. 1, and description thereof is omitted. With reference to FIG. 5, power switch S1 may be of a finger-touch responsive type or constructed such that it is closed at the early stage of a shutter release button depression. Electromagnetic member 15 has permanent magnet 15a which normally attracts armature 16a of stop lever 16. When electromagnetic coil 15b is energized by an output from focus control circuit Fc, the magnetic force field of the permanent magnet is counterbalanced by the magnetic field caused in the coil 15b, allowing stop lever 16 to rotate counterclockwise under the action of spring 17. Slide plate 18 corresponding to slide plate 3 in FIG. 1 has toothed or serrated portion 18a on its side with which claw 16b of stop lever 16 is engaged. Slide plate 18 is slidable laterally, i.e. vertically as viewed in FIG. 5 under the guide of guide pins 4a and 4b. Coupling pin 18b corresponds to the pin 3b in FIG. 1. With the camera shutter being cocked, ear portion 18c engages triangular projection 19a of engaging lever 19, to restrain slide plate 18 at a charging position against the action of spring 20. Restraining lever 19 is pivoted on stud 21 and is urged by spring 22 in a counterclockwise direction, as viewed in the side elevational view in FIG. 6. One side of triangular projection 19a opposite to the movement of slide plate 18 under the action of spring 20 has a steep incline, while the other side has a gentle incline so that projecting portion 18c of slide plate 18 may climb over triangular projection 19a when slide plate 18 is returned to its charging position by means of a mechanism (not shown) in response to a charging operation.

Furthermore, bent portion 19b of engaging lever 19 is located under shutter release button 1, so that it may turn about stud 21 to disengage slide plate 18 from triangular projection 19a at a final stroke of shutter release button depression.

With the above arrangement, when shutter release button 1 is touched or lightly depressed, power switch S1 is closed, and with shutter release button 1 further depressed, bent portion 19b of engaging lever 19 is depressed down, causing slide plate 18 to be disengaged from its restrained condition and laterally moves under the action of spring 20, whereby movable frame 6 of objective lens L is displaced along the optical axis of the camera objective for focusing. When light receiving element P detects the best focus condition, electromagnetic coil 15b of electromagnetic member 15 is energized by focus control circuit Fc, and stop lever 16 is rotated by spring 17 counterclockwise, with claw 16a engaging a tooth of slide plate 18. As a result, movable frame 6 of objective lens L is stopped at a best focus position. Subsequently, the diaphragm stopped-down operation and mirror retraction are initiated in response to the rotation of stop lever 16, and upon completion of the operations thereof, the shutter is released by means of a known mechanism (not shown).

Figure 7:
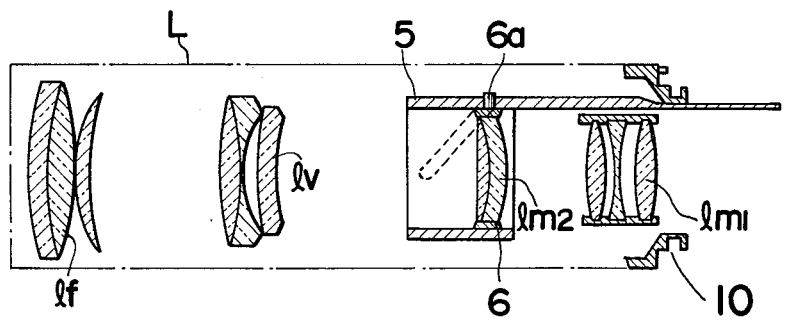
FIGS. 7 and 8 shows schematically exchangeable lenses to be used in the present invention.
Figure 8:
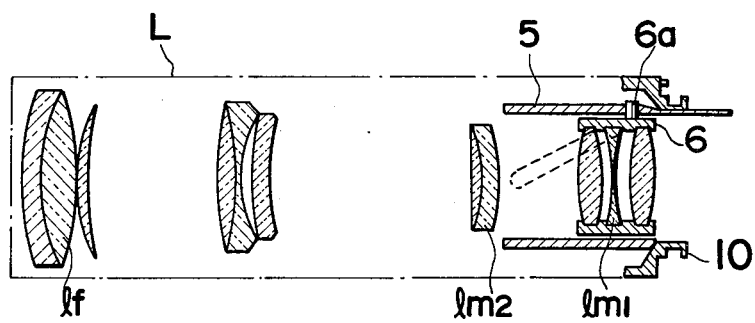

FIGS. 7 and 8 show desirable types of objective lenses for use in the embodiments of the present invention. The objective lens shown in FIG. 7 is of a variable magnification lens type, as disclosed in Japanese Laid-Open Patent No. 50-92127, in which lens group lm2 of rear master lens groups lm1 and lm2 is moved for focusing while variator lens group lv is moved for focal length variations. As described earlier, displacement ring 5 has coupling arm 5a, and movable frame 6 holds movable master lens group lm2 and is provided with pin 6a received in a cam slot of ring 5. This type of lens system can contain a number of lenses, and although it is long in overall length, a coupling mechanism for automatic focus control can be made simple. In addition, this lens system requires no mechanical compensation means for compensating for the change of focusing since focusing is made by an automatic focusing mechanism even as the focal distance is varied by moving variable magnification lens group lv. Furthermore, this type is advantageous in that the diameter of front lens group lf may be made smaller in comparison with a conventional front lens group displacement focusing type.

The objective lens shown in FIG. 8 is a telephoto type lens in which focusing is made by moving one, e.g. lm1 of rear master lens groups lm1 and lm2 along the optical axis of the camera objective. The present invention can be easily applied to even a telephoto lens when it is of the above type. In FIG. 8, the same reference symbols are used for the members corresponding, in operation, to those of FIG. 7.

Figure 9:
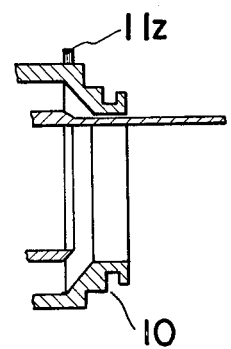
FIG. 9 shows another embodiment of a switch operating pin.

A slight modification of the above embodiment is shown in FIG. 9, wherein a signal pin a fixed on the outer circumference of a lens barrel at its rear end, and when an objective lens is rotated for a predetermined length relative to a camera body for the lens and camera body to be coupled with each other in position, power switch So may be closed by the signal pin. Needless to say, cameras to which the present invention is applicable are not limited to the single-lens reflex type, and they may be of a rangefinder type and other types as long as they are objective lens lens exchangeable cameras. As in the above embodiments, furthermore, coupling mechanisms between an objective lens and a camera body are not limited to the above depicted mechanism composed of an operating ring, a connecting arm and a slide plate, but any coupling member that functions like the connecting arm may be used as far as it can pass through the opening of a camera's objective mount when an objective lens and a camera body are coupled each other in position. For example, pinions or friction wheels may be provided at both ends of the connecting member for connection to a focus control mechanism in the camera body and a lens displacement mechanism in the objective lens.

What is claimed is:

1. An automatic focusing system for an objective lens exchangeable camera, comprising: an exchangeable lens having a lens group movable for focusing the lens; a fixed member with a mount for mounting said exchangeable lens on said camera, and a lens drive member movable relative to said fixed member for driving said lens group along the optical axis thereof, said mount including an aperture; a camera body including a movable member movable to any position corresponding to any position of said movable lens group, and means for determining the position of said movable member;/an intermediate member for interconnecting said movable member and said lens drive member upon coupling of said exchangeable lens with said camera body such that the position of said movable member determines the position of said movable lens group, said intermediate member being included in said exchangeable lens and extending through said aperture of said lens mount, said movable member including an abutting member abutting with said intermediate member from one direction to form one-directional engagement therewith; and biasing means for abutting said intermediate member and said abutting member.

2. An automatic focusing system as claimed in claim 1 wherein said intermediate member includes an elongated member provided in said objective lens to move in the plane normal to the optical axis of said lens and extending in the direction of said optical axis.

3. An automatic focusing system as claimed in claim 2 further comprising a light receiving means for detecting the focus condition of said exchangeable lens and an electric circuit for controlling the position of said movable member in accordance with the output of said light receiving means, and said exchangeable lens further includes a signal means for enabling said electric circuit when said exchangeable lens is coupled with said camera body.

4. An automatic focusing system as claimed in claim 3 wherein said electric circuit includes a power switch and said signal means includes means for closing said power switch upon coupling of said exchangeable lens with said camera body.

5. An automatic focusing system as claimed in claim 4 further comprising means for actuating said power switch in response to a finger operated touch mechanism on the camera body.

6. An automatic focusing system as in claim 1 wherein said intermediate member is interconnected with said movable member upon coupling of said exchangeable lens with the camera body and further comprising cam means for transmitting movement of said intermediate member to said movable lens group such that the lateral position of said movable member determines the axial position of said movable lens group.

* * * * *